US012743242B2

(12) United States Patent
Yoshida

(10) Patent No.: US 12,743,242 B2
(45) Date of Patent: Sep. 22, 2026

(54) IMAGE FORMATION APPARATUS FOR IMAGE DEFECTS, IMAGE FORMATION METHOD, AND STORAGE MEDIUM

(71) Applicant: CANON KABUSHIKI KAISHA, Tokyo (JP)

(72) Inventor: Teruyuki Yoshida, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 233 days.

(21) Appl. No.: 18/677,495

(22) Filed: May 29, 2024

(65) Prior Publication Data

US 2024/0402953 A1 Dec. 5, 2024

(30) Foreign Application Priority Data

May 30, 2023 (JP) ................................ 2023-089169

(51) Int. Cl.

*G06F 15/00* (2006.01)
*G06F 3/12* (2006.01)
*G06K 15/02* (2006.01)

(52) U.S. Cl.

CPC ............ *G06F 3/121* (2013.01); *G06F 3/1243* (2013.01); *G06K 15/022* (2013.01)

(58) Field of Classification Search

None

See application file for complete search history.

(56) References Cited

U.S. PATENT DOCUMENTS

2010/0157392 A1* 6/2010 Tsuzuki ............... G03G 21/046 358/474
2010/0165387 A1* 7/2010 Mizumukai ........ H04N 1/00342 358/1.15
2019/0121586 A1* 4/2019 Tsukamoto ........... G06F 3/1285

FOREIGN PATENT DOCUMENTS

JP 2019217746 A * 12/2019
JP 2020044789 A 3/2020

OTHER PUBLICATIONS

English translation of JP-2019217746-A. (Year: 2019).*

* cited by examiner

*Primary Examiner* — Mark R Milia
(74) *Attorney, Agent, or Firm* — Canon U.S.A., Inc. IP Division

(57) ABSTRACT

An image formation apparatus includes a first image formation unit configured to form a first image on a print medium being conveyed in the image formation apparatus, and a second image formation unit configured to form a second image on the first image formed on the print medium, in a case where the first image is normally formed, and not to form the second image in a case where the first image is not normally formed and the print medium is being conveyed.

10 Claims, 11 Drawing Sheets

100
101
102
103
104
105
106
107
108
109
110
111
112
113
114
115
116
117
118
119

111
103
401
400
102
402
900
CONVEYANCE DIRECTION

IMAGE FORMATION APPARATUS FOR IMAGE DEFECTS, IMAGE FORMATION METHOD, AND STORAGE MEDIUM

BACKGROUND

Technical Field

The present disclosure relates to control of image formation with a base.

Description of the Related Art

If printing on roll paper is temporarily stopped due to occurrence of a printing failure, resuming the printing can involve preparatory feeding of the roll paper to accelerate to a predetermined conveyance speed before printing again on the roll paper. The preparatorily fed roll paper results in a wasted blank area on the roll paper.

In addition, the resumption of printing can take some time in some cases, and in those cases it may be more efficient to continue the printing rather than to stop the printing if the printing failure is automatically cleared during the printing. Japanese Patent Application Laid-Open No. 2020-044789 discusses execution of printing without stopping printing at a printing apparatus.

Further, Japanese Patent Application Laid-Open No. 2019-217746 discusses a method for printing a two-dimensional code on a page with a printing failure (hereinafter, also referred to as a failed page) in order to prevent a failed page from being mixed into the print product. This method allows a failed page to be identified by reading the two-dimensional code after the printing, such identifying allowing for excluding the failed page.

SUMMARY

According to one embodiment of the present disclosure, an image formation apparatus includes a first image formation unit configured to form a first image on a print medium being conveyed in the image formation apparatus, and a second image formation unit configured to form a second image on the first image formed on the print medium, in a case where the first image is normally formed, and not to form the second image in a case where the first image is not normally formed and the print medium is being conveyed.

Further features of the present disclosure will become apparent from the following description of exemplary embodiments with reference to the attached drawings.

DESCRIPTION OF THE EMBODIMENTS

Figure 1:
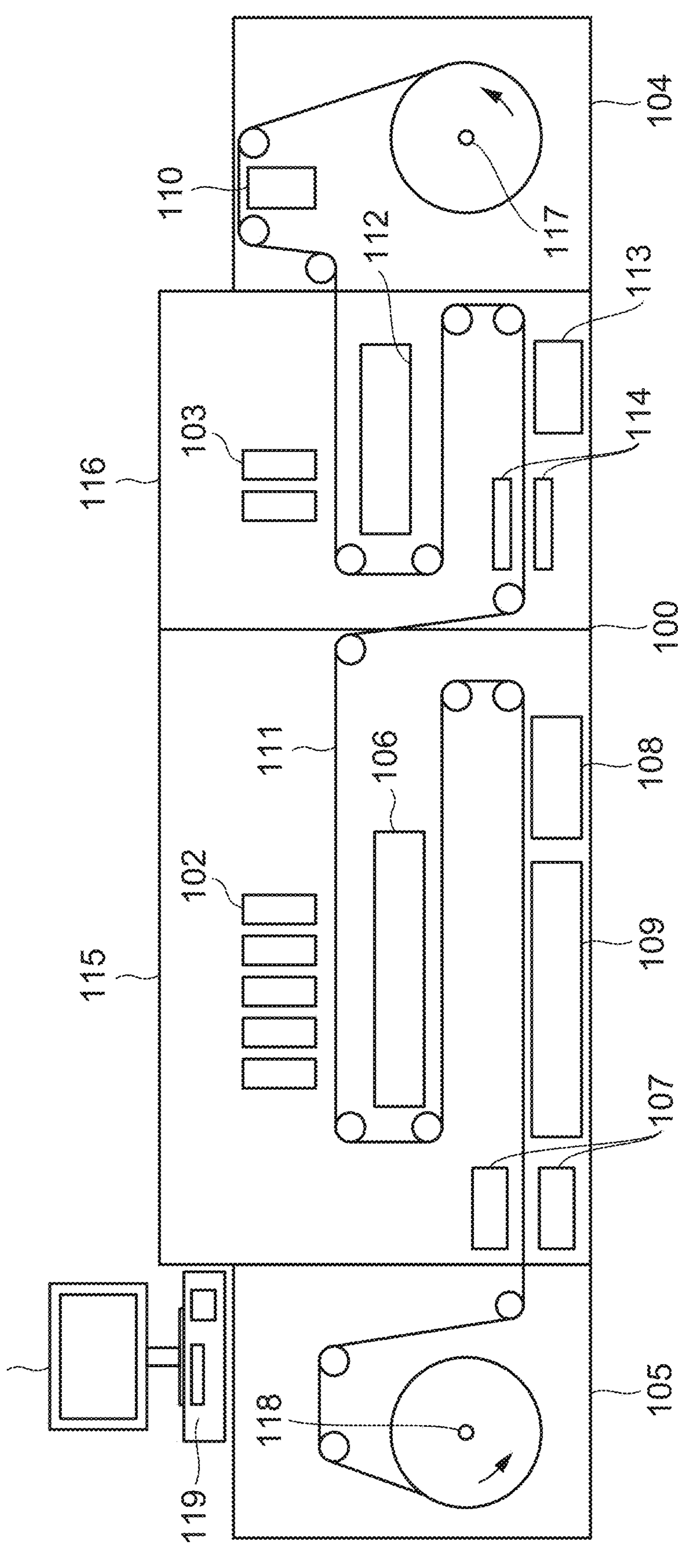
FIG. 1 is a diagram illustrating a configuration of an image formation system according to an exemplary embodiment.

FIG. 1 illustrates an example of an apparatus configuration of an image formation system that is an image formation apparatus according to an exemplary embodiment. A printing apparatus 100 is an apparatus that forms images on roll paper 111 that is continuous paper capable of continuous image formation. The printing apparatus 100 includes a paper feed device 104 that conveys the roll paper 111 and a printing device 116 that prints a base that corresponds to a first image. The base here refers to an image that forms a white ink layer as a base for printing an image on a transparent medium, for example. The base is also a recording layer that is formed before formation of an image, for the purpose of making it easy to fix a color material or color materials on a print medium, which is not necessarily a transparent medium. The description will be returned to FIG. 1. The printing apparatus 100 also includes a printing device 115 that additionally prints a second image to be superimposed on the first image, a paper ejection device 105 that winds up the roll paper 111, and an operation display unit 101 that is a user interface through which instructions are input from a user.

The paper feed device 104 is a device that supplies the roll paper 111 to the printing apparatus 100. The paper feed device 104 rotates a paper tube around which the roll paper 111 is wound about a rotation shaft 117 to convey the roll paper 111 via a plurality of rollers (a conveyance roller, a feed roller, and others) to the printing apparatus 100 at a specific speed.

The paper ejection device 105 is a device that winds up the roll paper 111 conveyed from the printing apparatus 100, around another paper tube in a roll form. The paper ejection device 105 holds the roll paper 111 wound around the paper tube on a rotation shaft 118 in a roll form as illustrated in FIG. 1, for example. The paper ejection device 105 is a device that rotates about the rotation shaft 118 and winds up the roll paper 111 conveyed to the paper tube at a specific speed via a plurality of rollers (for example, a conveyance roller and an ejection roller).

Before the start of printing, the roll paper 111 is extended from the paper feed device 104 to the paper ejection device 105. Specifically, the roll paper 111 is set in the paper feed device 104, and the leading end of the roll paper 111 is passed over a skew correction unit 110. Next, the leading end of the roll paper 111 is passed under a printing head 103. The leading end of the roll paper 111 is passed under a drying unit 112, over a cooling unit 113, and between scanner units 114. Then, the leading end of the roll paper 111 is passed under a printing head 102 of the printing device 115, under a drying unit 106, and over cooling units 108 and 109. The leading end of the roll paper 111 is then passed between scanner units 107 and wound around the paper tube on the rotation shaft 118 of the paper ejection device 105.

After the roll paper 111 is extended through the image formation system a print job is input to a control personal computer (PC) 119 of the image formation system. After the input of the print job, a print start button on the operation display unit 101 is pressed to start printing.

Figure 2:
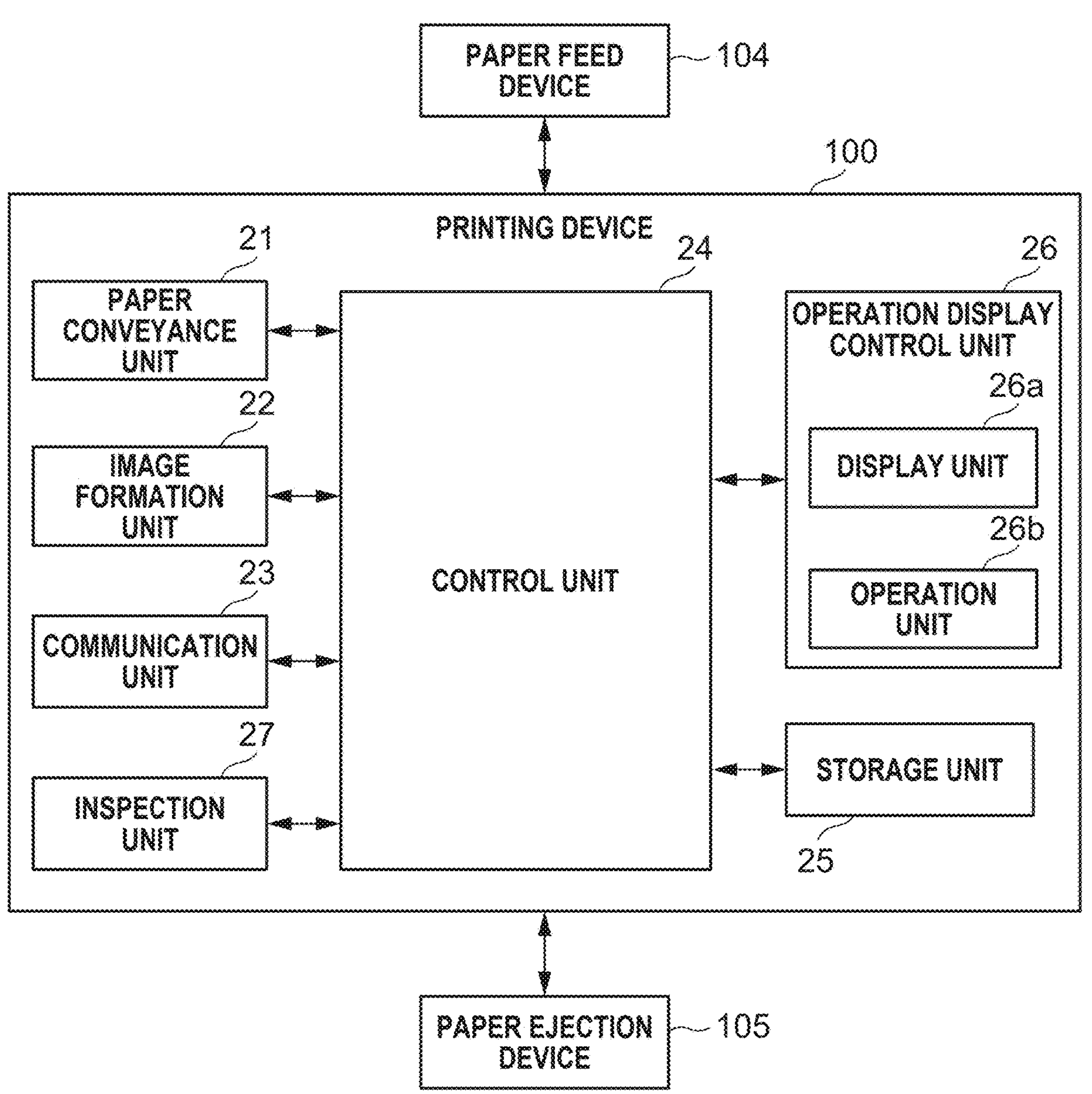
FIG. 2 is a block diagram illustrating functions of the image formation system according to the present exemplary embodiment.

FIG. 2 is a functional block diagram illustrating a control configuration of the printing apparatus 100. As illustrated in the drawing, the printing apparatus 100 includes a paper conveyance unit 21, an image formation unit 22, a communication unit 23, a control unit 24, a storage unit 25, and an operation display control unit 26, for example.

The paper conveyance unit 21 is a conveyance mechanism for the roll paper 111 in the printing apparatus 100. For example, the paper conveyance unit 21 conveys the roll paper 111 conveyed from the paper feed device 104 to the image formation unit 22 via a plurality of rollers. Then, the paper conveyance unit 21 conveys the roll paper 111 having passed through the image formation unit 22 to the paper ejection device 105. The image formation unit 22 forms images on the roll paper 111 supplied from the paper feed device 104, based on print data of which output is instructed.

The image formation unit 22 conveys the roll paper 111 with the images formed thereon to the paper ejection device 105.

The communication unit 23 includes a communication control card, such as a local area network (LAN) card, for example. The communication unit 23 transmits and receives various kinds of data to and from an external device (for example, a personal computer) connected to a communication network, such as a LAN or a wide area network (WAN). The control unit 24 includes a central processing unit (CPU) and a random access memory (RAM), for example.

The CPU of the control unit 24 reads various programs, such as system programs and processing programs stored in the storage unit 25, and loads the programs in the RAM, and executes various processes in accordance with the loaded programs. For example, the control unit 24 can perform an image formation process for executing an image formation job (hereinafter, referred to as a job) in response to a user's instruction. The storage unit 25 is a non-volatile semiconductor memory (flash memory), or a hard disk drive (HDD), for example.

The storage unit 25 stores various programs including system programs and processing programs to be executed by the control unit 24 and various kinds of data for executing these programs.

The operation display control unit 26 includes a touch panel-equipped liquid crystal display (LCD), for example, and includes a display unit 26*a* and an operation unit 26*b*. The display unit 26*a* displays various kinds of information on a display screen in accordance with display control signals input from the control unit 24. The operation unit 26*b* includes various operation keys, such as a numeric keypad and a start key, and receives various input instructions from the user and outputs operation signals to the control unit 24. Operations of the printing apparatus 100 performing an image formation process on the roll paper 111 will now be described. First, the user creates base data and additional printing data for a job and makes a print setting for the job at an external device, and transmits the information to the printing apparatus 100 via a communication network. The control unit 24 receives the job data and the print setting for the job transmitted from the external device via the communication unit 23.

An inspection unit 27 checks whether the printed image has no defects. To do this, the inspection unit 27 compares read data as a result obtained by the scanners 107 or 114 reading an image printed using job (print) data received via the communication unit 23 and the print data before the printing of the image. If any defect is detected as the result of the check, the inspection unit 27 executes a defect-response sequence (described below). Various inspection methods, such as a method in which a printed inspection pattern is read by a scanner, a method in which a printed image directly read by a camera or a scanner is inspected, and a method in which the status of ink discharge from nozzles is monitored, are available. In the present exemplary embodiment, a method in which a printed image is read by a scanner is used to check whether the printed image has no defects.

Figure 3:
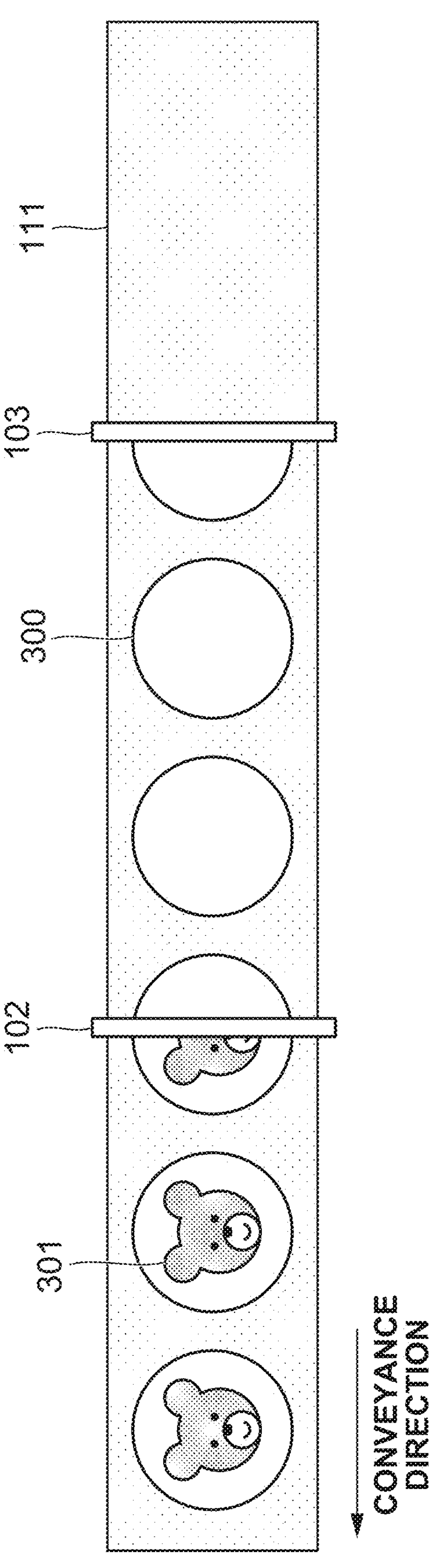
FIG. 3 is a schematic diagram illustrating printing of a normal image according to the present exemplary embodiment.

FIG. 3 illustrates an example of image formation. While the roll paper 111 is being continuously conveyed in the conveyance direction illustrated in the drawing, the printing head 103 prints a base 300 on the roll paper 111. Subsequently, the drying unit 112 and the cooling unit 113 fixes the base 300 to the roll paper 111, and then the printing head 102 performs additional printing to print an image 301. After that, the drying unit 106 and the cooling units 108 and 109 fix the image 301 to the roll paper 111.

Figure 4:
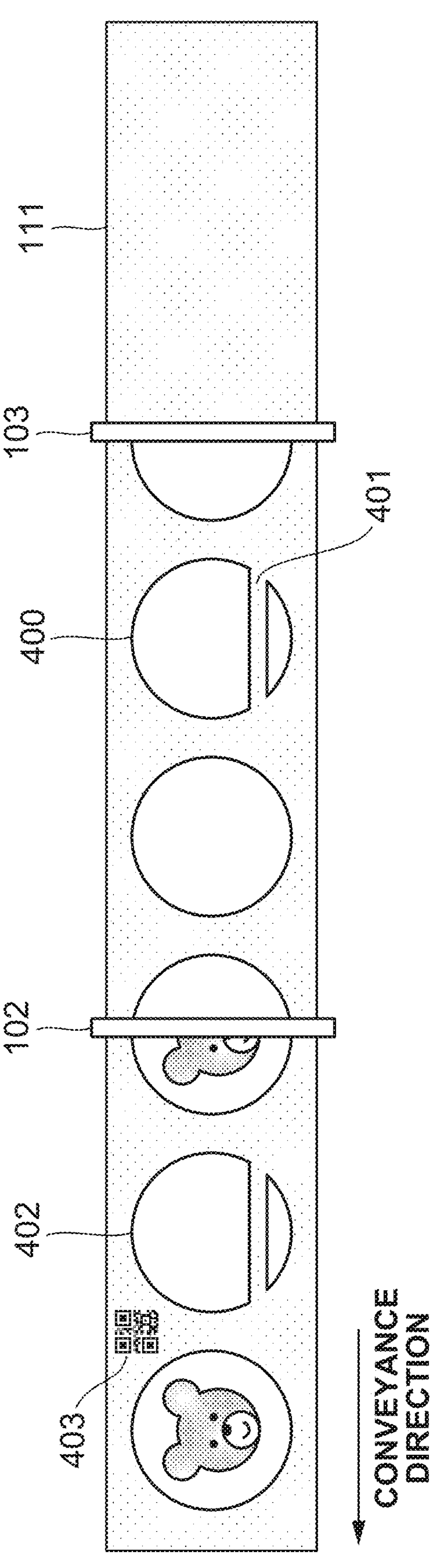
FIG. 4 is a schematic diagram illustrating printing of a defective image according to the present exemplary embodiment.

FIG. 4 illustrates an example of a state in which a defective image is detected by the printing head 103 during image formation. During printing, there occurs a rare phenomenon that ink is not discharged (hereinafter, referred as to a non-discharge). In this case, for example, a streak 401 appears on a defective image 400, resulting in a determination that the defective image 400 has a defect. If such a defective image is detected, the image formation being performed by the printing head 102 is stopped only on the relevant page.

If image formation as additional printing is stopped, an additional image is not printed, producing a defective print 402 with the base alone. In this case, a two-dimensional code 403 can be printed, instead of an image 301, in order to allow the defective print 402 to be located by a post-processing machine connected to the image formation system.

The two-dimensional code 403 can be disposed at another predetermined position rather than to be superimposed on the defective print 402 by additional printing, considering the ease of handling at the post-processing machine. While FIG. 4 illustrates a quick-response code (QR Code®) as the two-dimensional code, the two-dimensional code can be a bar code or a simple mark.

Figure 5:
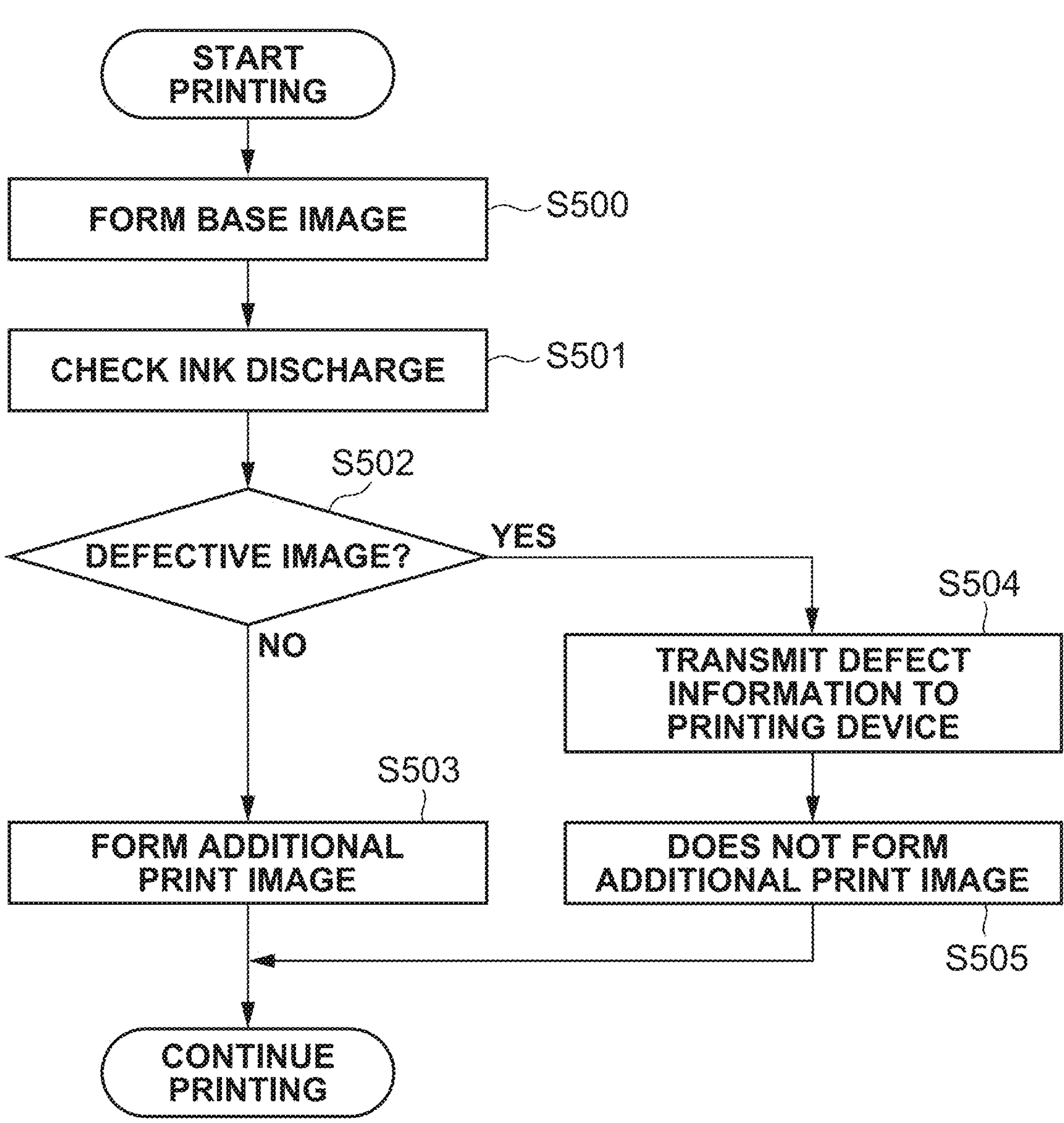
FIG. 5 is a flowchart of printing of the defective image according to the present exemplary embodiment.

FIG. 5 illustrates an example of a control procedure in the example illustrated in FIG. 4. In step S500, the printing head 103 prints a base image on the roll paper 111.

In step S501, the scanners 114 read the printed image, and the control unit 24 determines whether the printed image has no defects from the read image. The defect here refers to a defect due to the non-discharge described above or uneven discharge where the ink is not undischarged but is discharged in a smaller amount than expected.

If it is determined by the ink discharge check that the image is not defective, that is, if the first image is normally formed (NO in step S502), the process proceeds to the downward conditional branch. In step S503, the printing head 102 prints the additional print image.

After that, the printing head 102 continues to print on the subsequent pages.

In step S502 as the conditional branch point, if it is determined that the image is defective, that is, if the first image is not normally formed (YES in step S502), in step S504, defective image information indicating the presence of a defect in the base image is transferred to the printing head 102. In step S505, the printing head 102 receives the defective image information, and does not execute the image formation on the relevant page but continues the image formation on the subsequent pages.

Figure 6:
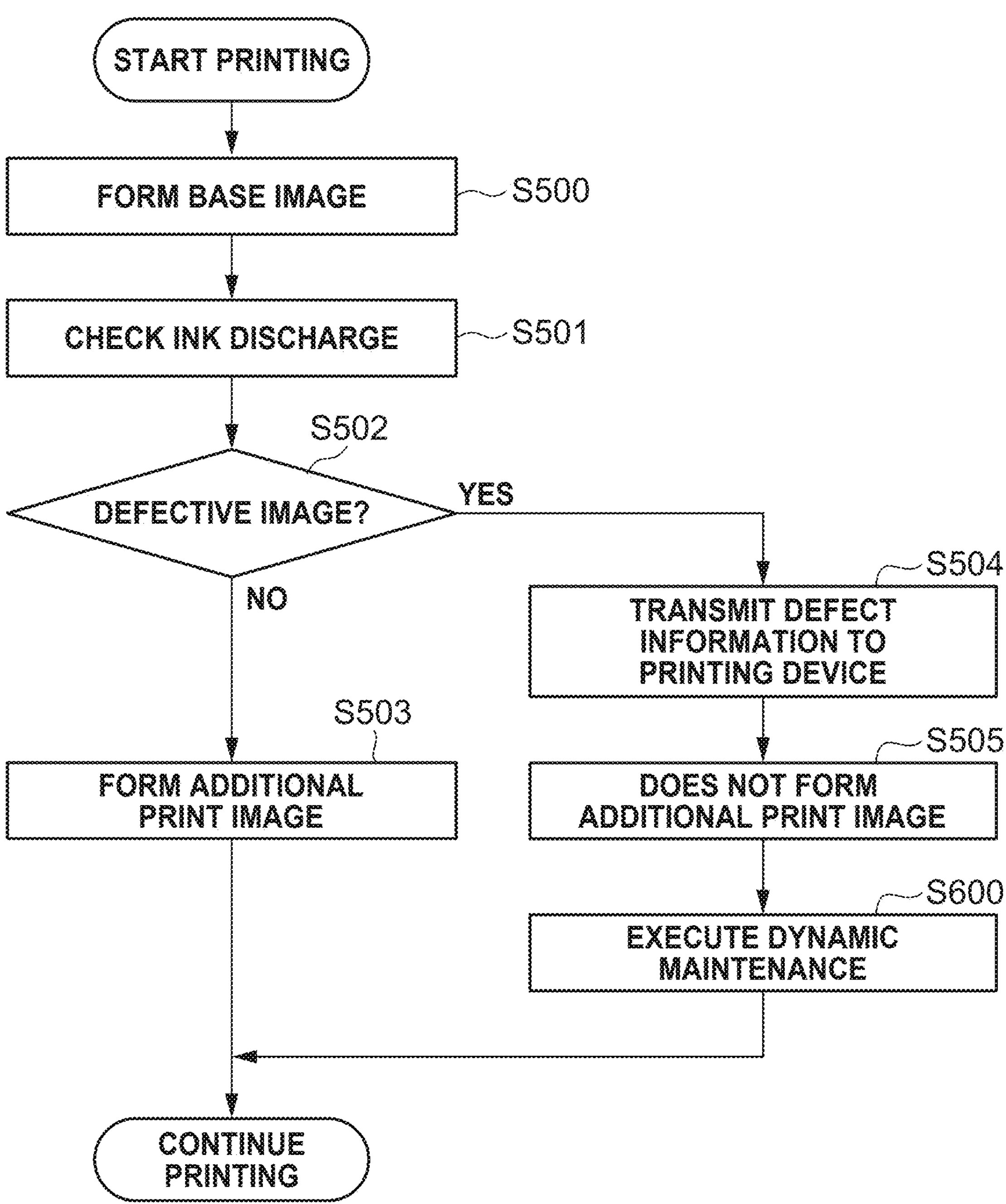
FIG. 6 is a flowchart of execution of maintenance on the defective image page according to the present exemplary embodiment.

FIG. 6 illustrates an example of effectively using the defective image. Steps S500 to S505 are the same as those described above. If no image formation is performed in step S505, the relevant page is an unused area. Thus, in step S600, the relevant page is used for dynamic maintenance of the printing head 102. After that, the printing head 102 continues to print on the subsequent pages. At the dynamic maintenance, the printing head 102 prints some pattern outside the image area during the printing of the image, the scanners 107 read the pattern to dynamically correct the registration. Besides, for example, maintenance of correcting color unevenness is performed. The types of maintenance are not limited to the above-described ones.

Figure 7:
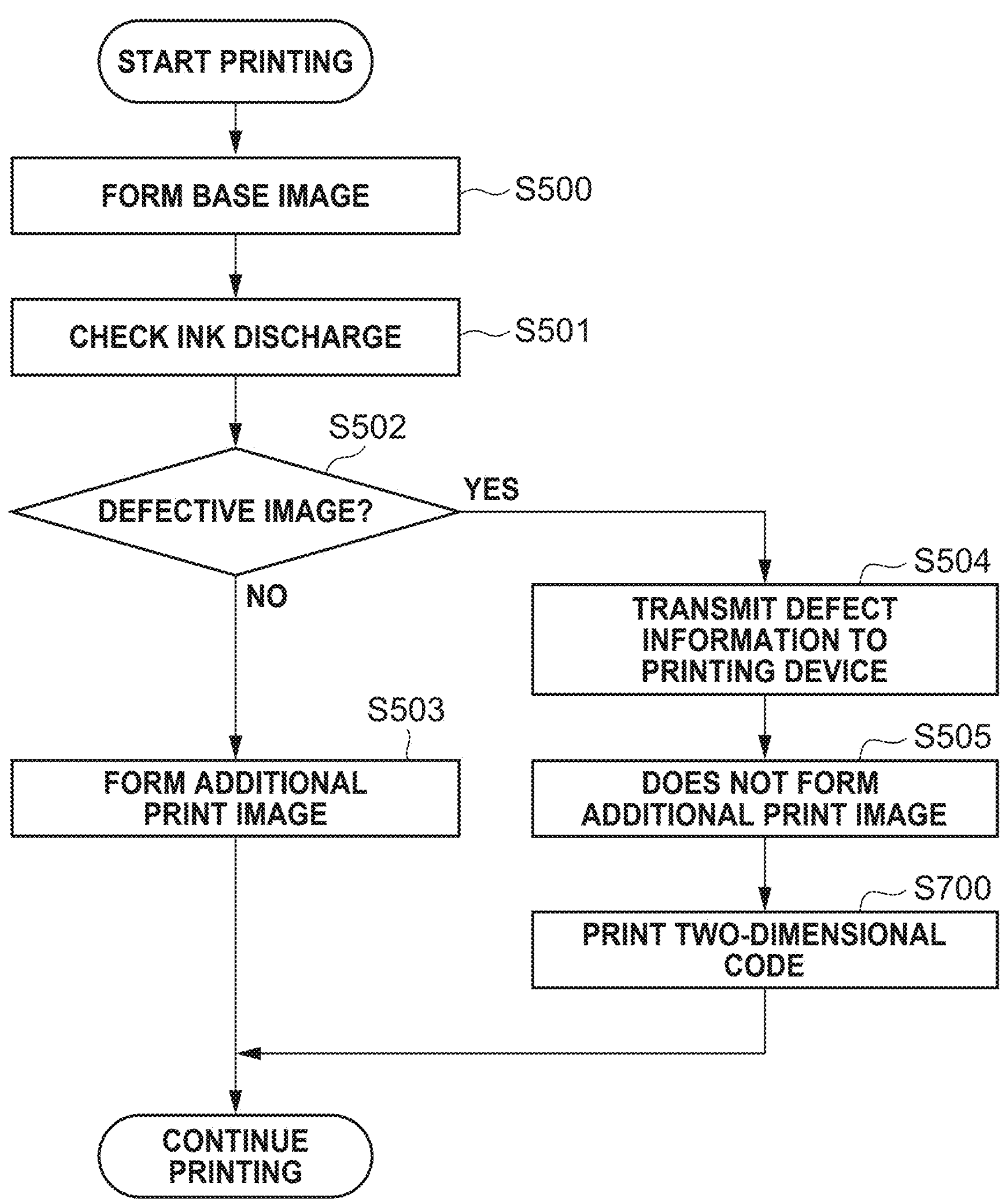
FIG. 7 is a flowchart of printing of a two-dimensional code on a defective image page according to the present exemplary embodiment.

FIG. 7 is a diagram describing an example of printing a two-dimensional code as a pattern for providing defective page information to the post-processing machine. Steps S500 to S505 are the same as those described above.

If no image formation is performed in step S505, in step S700, the printing head 102 prints the two-dimensional code 403 in order to provide the defective image information on the relevant page to the post-processing machine. After that, the printing head 102 continues to print on the subsequent pages. Various types of two-dimensional codes, such as a bar code and a QR Code®, are available. That is, the pattern here can be, not limited to a geometric pattern, a character, a number, or a combination thereof as long as the pattern provides information indicating that the base as the first image is not normally formed to the subsequent step(s). In addition, the post-processing machine here refers to a stripping machine or a cutting machine. Any type of post-processing machine to which the information is to be provided via a two-dimensional code can be used.

Figure 8:
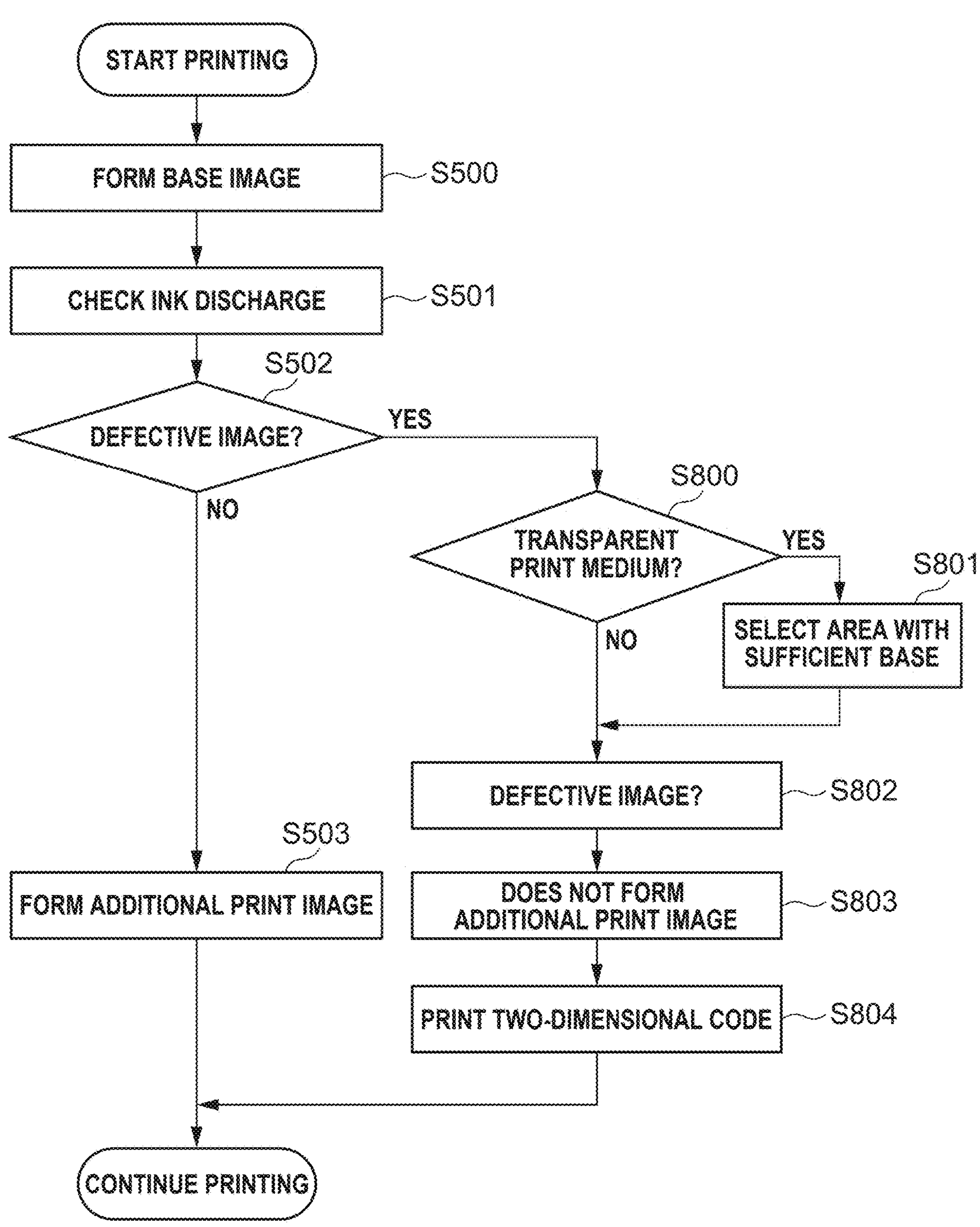
FIG. 8 is a flowchart of printing a two-dimensional code on a transparent substrate according to the present exemplary embodiment.

A two-dimensional code for providing the defective page information to the post-processing machine printed on a transparent film cannot be read appropriately in some cases. For example, under a condition with a black two-dimensional code printed on a transparent film and a black housing of the post-processing machine, the post-processing machine may fail to discriminate the two-dimensional code from the background, resulting in a failure to read the two-dimensional code. FIG. 8 is a control procedure when the roll paper 111 is a transparent substrate. Steps S500 to S503 are the same as those described above. In step S502 as the conditional branch point, if it is determined that the image is defective (YES in step S502), in step S800, the control unit 24 determines whether the roll paper 111 is transparent. Specifically, the control unit 24 receives an instruction input from the user as to whether the roll paper 111 is transparent, and makes a determination in accordance with the instruction. Another determination method is available in which paper type information set as a printing condition before printing is compared with pre-registered paper type information, and it is determined whether the roll paper 111 is transparent from the registered information on the compared paper. Yet another method is available in which the transparency of the roll paper 111 is determined using an optical sensor.

If the roll paper 111 is not transparent (NO in step S800), in step S802, the control unit 24 transmits the defective page information to the printing head 102.

In step S803, the printing head 102 does not perform image formation on the relevant page, and in step S804, the printing head 102 prints a two-dimensional code. After that, the printing head 102 continues to print on the subsequent pages.

If the roll paper 111 is transparent (YES in step S800), in step S801, the control unit 24 calculates an area where the base is sufficiently printed on the relevant page. The area is calculated from the information obtained by reading the base image by the scanners 114 in step S501. After that, in step S802, the control unit 24 transmits the defective image information including the area information calculated in step S801 to the printing head 102. In step S803, the printing head 102 does not perform additional printing on the relevant page, and in step S804, the printing head 102 prints the two-dimensional code in the selected area, and continues to print on the subsequent pages.

Figure 9:
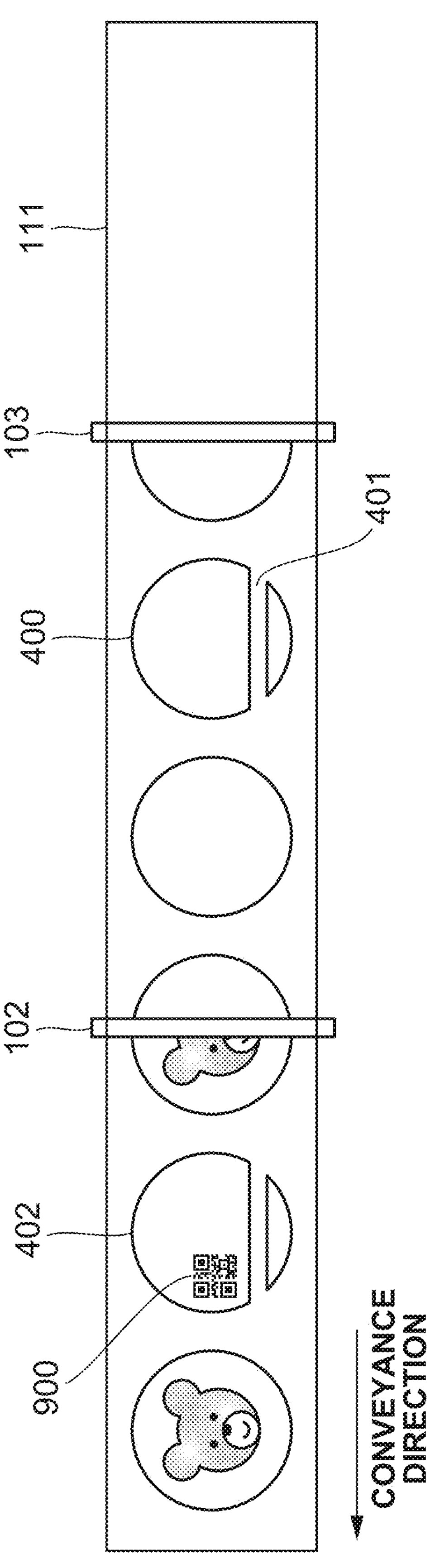
FIG. 9 is a schematic diagram illustrating printing of the two-dimensional code on the transparent substrate according to the present exemplary embodiment.

FIG. 9 is a schematic diagram illustrating a state in the control procedure in FIG. 8. When the defective image 400 with the streak 401 is formed by the printing head 103, the control unit 24 transmits the defective image information to the printing head 102. The defective image information includes information about the area where the base is sufficiently printed, which is calculated from the data read by the scanners 114. The printing head 102 does not perform image formation on the relevant page 402 with the defective image information, but prints a two-dimensional code 900 superimposed on the area with the sufficient base.

Figure 10:
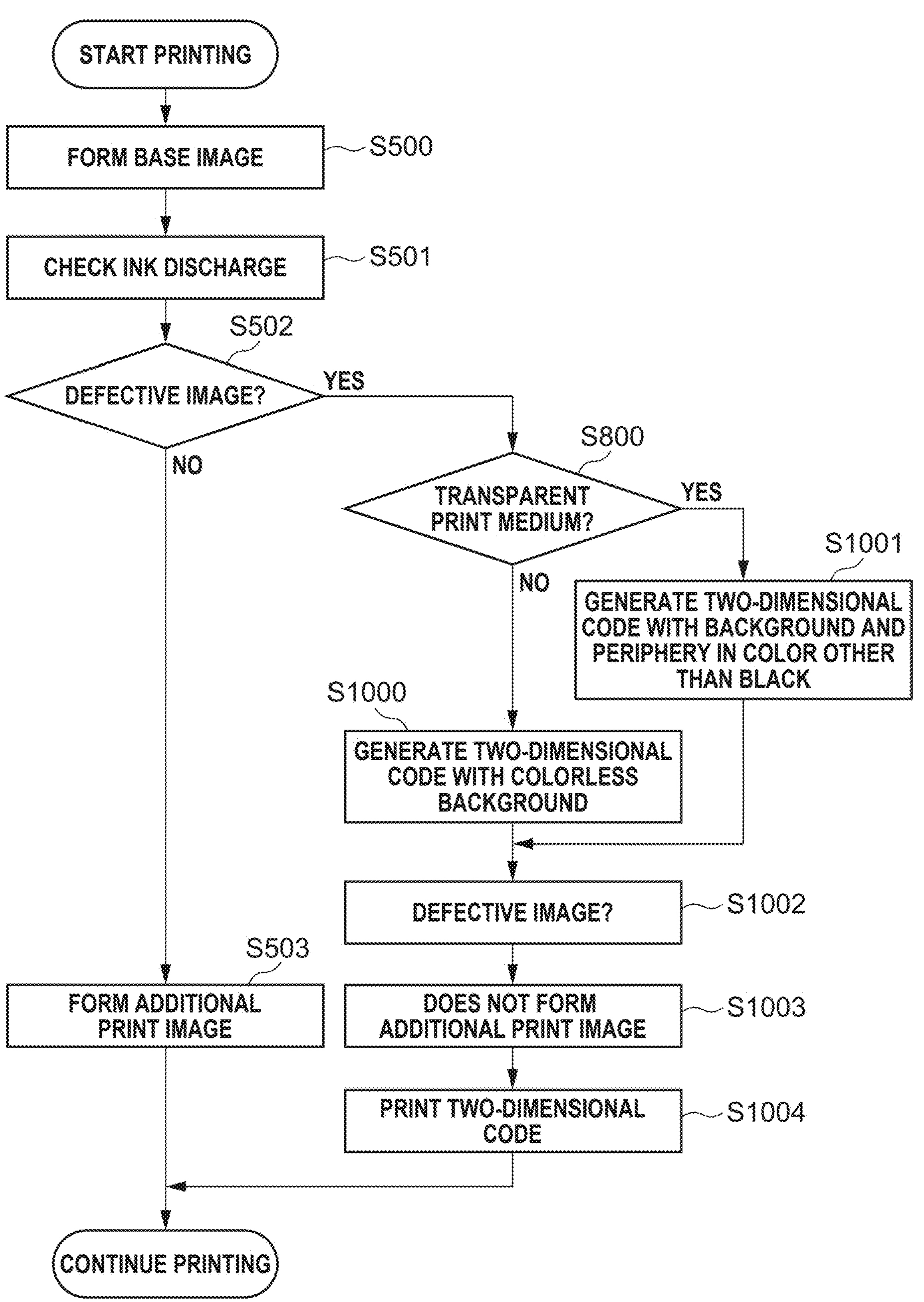
FIG. 10 is a flowchart of printing two-dimensional codes on the transparent substrate according to the present exemplary embodiment.

FIG. 10 illustrates another control procedure with the roll paper 111 as a transparent substrate. Steps S500 to S503 and S800 are the same as those described above.

In step S800, if it is determined that the roll paper 111 is not transparent (NO in step S800), in step S1000, the control unit 24 generates a two-dimensional code with a colorless background. In step S1002, the control unit 24 transmits the generated two-dimensional code and the defective page information to the printing head 102. In step S1003, the printing head 102 does not perform image formation on the relevant page, and in step S1004, the printing head 102 prints the received two-dimensional code outside the image area as with the two-dimensional code 403. After that, the printing head 102 continues to print on the subsequent pages.

In step S800, if it is determined that the roll paper 111 is transparent (YES in step S800), in step S1001, the control unit 24 generates a two-dimensional code with its background and periphery in a specific color. In step S1002, the control unit 24 transmits the generated two-dimensional code and the defective page information to the printing head 102. In step S1003, the printing head 102 does not perform image formation on the relevant page, and in step S1004, the printing head 102 prints the received two-dimensional code outside the image area as with the two-dimensional code 403. After that, the printing head 102 continues to print on the subsequent pages.

In the present example, the method is used in which a two-dimensional code is generated. Alternatively, both a two-dimensional code with a colorless background and a two-dimensional code with a background and a periphery filled in a specific color may be held in advance.

Figure 11:
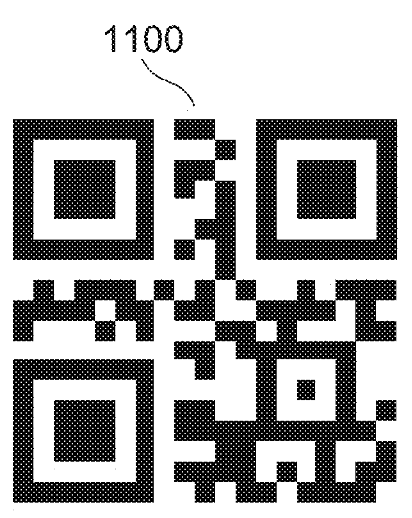
FIG. 11 is a schematic diagram of two-dimensional codes printed on a transparent substrate according to the present exemplary embodiment.
Figure 11:
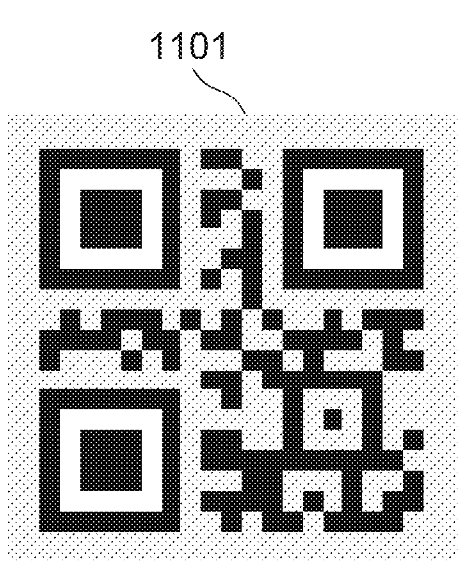

FIG. 11 is a schematic diagram of two-dimensional codes generated in the control procedure of FIG. 10. A code 1100 is an example of the two-dimensional code with a colorless background generated in step S1000. The code part is formed in black, and the background and the periphery are not printed in a specific color. The color of the code part is not limited to black and the code part may be formed in another color. A code 1101 is a two-dimensional code generated in step S1001. The code part is formed in black, and the background and the periphery are filled in yellow, for example, so that even the two-dimensional code on a transparent substrate is readable. The colors are not limited to a combination of black and yellow, and a combination of other colors can be used.

In the above-described example, the print medium is roll paper. However, the print medium in the present exemplary embodiment is not limited to roll paper. That is, the print medium can be cut paper. Further, in the above-described example, the ink is taken as an example of a color material for use in printing. However, another color material, for example, toner can be used.

The present example can be implemented by supplying a program for carrying out one or more functions of the above-described exemplary embodiment to a system or an apparatus via a network or a storage medium, and reading and executing the program by one or more processors in the system or the apparatus. The present example can also be implemented by a circuit for implementing the one or more functions (for example, an application specific integrated circuit (ASIC)).

In forming a first image that corresponds to a base on a print medium, and forming a second image superimposed on the base, forming the second image on the page where the first image is defective results in a waste of ink. According to the present disclosure, the waste of ink can be reduced.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-089169, filed May 30, 2023, which is hereby incorporated by reference herein in its entirety.

What is claimed is:

1. An image formation apparatus comprising:

a first image formation unit configured to form a first image on a print medium being conveyed in the image formation apparatus; and a second image formation unit configured to form a second image on the first image formed on the print medium, in a case where the first image is normally formed, and not to form the second image in a case where the first image is not normally formed and the print medium is being conveyed, wherein in a case where the first image is not normally formed, the second image formation unit forms a pattern different from the second image, and wherein with the print medium being transparent, the second image formation unit performs image formation in which a background or periphery of the pattern is filled in a specific color.

2. The image formation apparatus according to claim 1, wherein the pattern is a two-dimensional code.

3. The image formation apparatus according to claim 1, wherein the pattern is information indicating that the first image is not normally formed.

4. The image formation apparatus according to claim 1, wherein the second image formation unit forms the pattern at a position where the first image is formed.

5. The image formation apparatus according to claim 4, further comprising a determination unit configured to determine whether there is an area sufficient to form the pattern at the position where the first image is formed.

6. The image formation apparatus according to claim 1, further comprising a first reading unit configured to read the first image after the first image formation unit has formed the first image on the print medium, wherein the second image formation unit forms the pattern based on a result of reading by the reading unit.

7. The image formation apparatus comprising:

a first image formation unit configured to form a first image on a print medium being conveyed in the image formation apparatus; and a second image formation unit configured to form a second image on the first image formed on the print medium, in a case where the first image is normally formed, and not to form the second image in a case where the first image is not normally formed and the print medium is being conveyed, wherein image formation on the print medium is not stopped even in a case where the second image formation unit does not form the second image.

8. An image formation apparatus comprising:

a first image formation unit configured to form a first image on a print medium being conveyed in the image formation apparatus;

a second image formation unit configured to form a second image on the first image formed on the print medium, in a case where the first image is normally formed, and not to form the second image in a case where the first image is not normally formed and the print medium is being conveyed;

a second reading unit configured to read the pattern after the second image formation unit has formed the second image on the print medium; and a control unit configured to, with the pattern read by the second reading unit, perform control to stop the image formation on the print medium, wherein in a case where the first image is not normally formed, the second image formation unit forms a pattern different from the second image.

9. A non-transitory computer-readable storage medium storing a program for causing an image formation apparatus to execute:

forming a first image on a print medium being conveyed in the image formation apparatus; and forming a second image on the first image formed on the print medium, in a case where the first image is normally formed, and not forming the second image in a case where the first image is not normally formed and the print medium is being conveyed, wherein in a case where the first image is not normally formed, the second image formation unit forms a pattern different from the second image, and wherein with the print medium being transparent, the second image formation unit performs image formation in which a background or periphery of the pattern is filled in a specific color.

10. An image formation method comprising:

forming a first image on a print medium being conveyed in the image formation apparatus; and forming a second image on the first image formed on the print medium, in a case where the first image is normally formed, and not forming the second image in a case where the second image is not normally formed and the print medium is being conveyed, wherein in a case where the first image is not normally formed, the second image formation unit forms a pattern different from the second image, and wherein with the print medium being transparent, the second image formation unit performs image formation in which a background or periphery of the pattern is filled in a specific color.

* * * * *